(12) United States Patent
Fukuoka

(10) Patent No.: US 8,040,416 B2
(45) Date of Patent: Oct. 18, 2011

(54) SOLID-STATE IMAGING APPARATUS

(75) Inventor: Naoto Fukuoka, Atsugi (JP)

(73) Assignee: Olympus Corporation, Tokyo (JP)

( * ) Notice: Subject to any disclaimer, the term of this patent is extended or adjusted under 35 U.S.C. 154(b) by 439 days.

(21) Appl. No.: 12/391,448

(22) Filed: Feb. 24, 2009

(65) Prior Publication Data

US 2009/0213253 A1 Aug. 27, 2009

(30) Foreign Application Priority Data

Feb. 26, 2008 (JP) ................................. 2008-043969

(51) Int. Cl.
*H04N 5/335* (2011.01)
*H01L 27/00* (2006.01)
(52) U.S. Cl. ...................... 348/301; 348/308; 250/208.1
(58) Field of Classification Search ............... 250/208.1; 257/290, 291; 348/294, 300, 301, 308
See application file for complete search history.

(56) References Cited

U.S. PATENT DOCUMENTS

| 7,906,752 B2 * | 3/2011 | Fukuoka et al. ........... 250/208.1 |
| 2009/0295970 A1 * | 12/2009 | Fukuoka ...................... 348/308 |
| 2010/0085448 A1 * | 4/2010 | Fukuoka ...................... 348/241 |

FOREIGN PATENT DOCUMENTS

JP 2001-230974 A 8/2001

* cited by examiner

*Primary Examiner* — David N Spector
(74) *Attorney, Agent, or Firm* — Westerman, Hattori, Daniels & Adrian, LLP

(57) ABSTRACT

A solid-state imaging apparatus including a plurality of pixels, each pixel containing a photoelectric conversion section; an accumulation section; a transfer section; an amplification section; and a reset section for resetting the accumulation section; the pixel section having output signal lines provided column by column onto which the pixel signal is outputted, connected to the other end of a constant current supply having one end grounded; and a control section where, of a first one of the pixels and a second one of the pixels connected to the same one output signal line, taking the first pixel as one of the pixels subject to reading of pixel signal conforming to the incident light and the second pixel as non-subject one of the pixels set in accordance with a location of the first pixel, an output from the second pixel onto the output signal line is used at the time of outputting of the pixel signal from the first pixel onto the output signal line to effect control so that an electric potential difference between the one end and the other end of the constant current supply is kept in a range where the constant current supply is operable.

7 Claims, 11 Drawing Sheets

HIGHT-LUMINANCE PORTION

TRANSVERSE STRIPE AT INCIDENCE OF HIGHT-LUMINANCE LIGHT

PROPER LEVEL

103: CONTROL SIGNAL GENERATION CIRCUIT

TO HORIZONTAL SIGNAL LINE

SOLID-STATE IMAGING APPARATUS

This application claims benefit of Japanese Patent Application No. 2008-43969 filed in Japan Feb. 26, 2008, the contents of which are incorporated by this reference.

BACKGROUND OF THE INVENTION

The present invention relates to solid-state imaging apparatus for use for example in a video camera, digital still camera, etc., and more particularly relates to the solid-state imaging apparatus using an amplified solid-state imaging device having an amplification function within its imaging region.

In recent years, MOS (Metal Oxide Semiconductor) type imaging devices (image sensor) are drawing attention and are practically used as solid-state imaging device. The MOS imaging devices are capable of being driven by a single power supply as compared to CCD (Charge Coupled Device) type imaging devices. Further, while CCD imaging devices require an exclusive process, the MOS image sensors have an identical manufacturing process as other LSI's and thus are superior in providing many functions as they are readily made into an SOC (system on chip). Furthermore, since the MOS image sensors have an amplification circuit (amplifier) in each individual pixel to amplify signal electric charges within the pixel, they are less likely to be affected by noise due to the transmission path of signals. Moreover, the signal electric charges in each pixel of the MOS image sensor can be extracted by means of a selection system so that in theory, the accumulation time and/or read sequence of signals can be arbitrarily controlled pixel by pixel.

With the MOS image sensors, when a high-luminance light is incident on a partial region, a change in electric potential occurs along a left and right direction of the rows on which the high-luminance light is incident so that an image as if a white band-like light is incident is obtained. Such a phenomenon in the present specification will be referred to hereinafter as "transverse stripe phenomenon" at the time of incidence of high-luminance light. FIG. 1 schematically illustrates an image in the case with an occurrence of the transverse stripe phenomenon at the time of incidence of high-luminance light. Shown in FIG. 1 is an output image when the high-luminance light is incident in the vicinity of a center of the image sensor, where a band-like transverse stripe due to change in electric potential is seen along the row direction on the left and right thereof. This transverse stripe phenomenon at the time of incidence of high-luminance light will be described below together with a typical operation of MOS image sensor.

FIG. 2 shows a block diagram of a typical MOS image sensor. Pixels for converting light into electrical signal are two-dimensionally arranged into a matrix, where P(i, j) represents a unit pixel of i' th row and j' th column (i, j: an integral number). The pixel P(i, j) is to output a received light as voltage onto a vertical signal line SL-V(j) by means of a reset pulse φ RS(i), a transfer pulse φ TX(i), and a select pulse φ SE(i) outputted from a vertical scanning circuit 101. The pixel P(i, j) is connected to a constant current supply CCS(j) and to a CDS (Correlated Double Sampling) circuit CDS(j) through the vertical signal line SL-V(j). The CDS circuit CDS(j) is connected to a horizontal signal line SL-H through the vertical signal line SL-V(j). The CDS circuit CDS(j) eliminates variance of signal that is different from one pixel to another by differentiating between a reset signal and an image signal from the pixel (i, j) by means of a clamp pulse φ CL and a sample-and-hold pulse φ SH. An output from the CDS circuit CDS(j) is outputted onto the horizontal signal line SL-H by means of a column select pulse φ HP outputted from the horizontal scanning circuit 102 so as to obtain a signal Vout amplified at an amplification circuit Amp. By repeating the above operation for a predetermined number of pixels, two-dimensional image signals can be obtained. These operations are controlled by signals outputted from the vertical scanning circuit 101 and the horizontal scanning circuit 102 under instructions from a control signal generation circuit 103.

FIG. 3 shows a circuit diagram of the pixel P(i, j) and the constant current supply CCS(j) in FIG. 2. A unit pixel P(i, j) includes: PD(i, j), a photodiode; Mtr(i, j), a transfer transistor; Msf(i, j), an amplification transistor; Mrs(i, j), a reset transistor; Mse(i, j), a select transistor; FD(i, j), a floating diffusion section; SL-V(j), a vertical signal line; Vgs(i, j), a gate-source voltage of the amplification transistor Msf(i, j); CCS(j), a constant current supply; Vccsgs(j), a gate-source voltage of the transistor of the constant current supply CCS(j); Vsl-v(j), a voltage of vertical signal line; SL-V(j), a vertical signal line; Vdd, a power supply voltage line; Vccsg, a gate voltage line of the transistor within the constant current supply CCS(j).

FIG. 4 is a circuit diagram of the CDS circuit CDS(j) in FIG. 2. FIG. 4 includes: Mcl(j), a clamp transistor; Msh(j), a sample-and-hold transistor; Ccl(j), a clamp capacitor; Csh(j), a sample-and-hold capacitor; Vcdso(i, j), an output voltage from the CDS circuit CDS(j); Vcl, a clamp voltage; φ CL, a clamp pulse; and φ SH, a sample-and-hold pulse. At the CDS circuit CDS(j), a reset signal (voltage at the time of attaining φ CL=Low) and a signal of light (voltage at the time of attaining φ SH=Low) of pixel in the column j are differentiated so as to output Vcdso(i, j).

An operation in the case where a high-luminance light is incident in the MOS image sensor having such construction will now be described by way of FIG. 5.

(1): when a light having a large light amount has entered the pixel (i, j), the electrical potential of the vertical signal line SL-V(j) at the time of outputting an image signal of the pixel (i, j) is extremely lowered so that a voltage outside of an operation range of the current supply CCS(j) (voltage in a non-saturation region of the drain-source voltage Vccsds of the transistor of the current supply CCS(j)) is applied on the current supply CCS(j).

(2): as a result that the condition of (1) has been attained, the current supply CCS(j) is caused to operate in its non-saturation region so that the electric current becomes smaller than normal.

(3): as a result that the condition of (2) has been attained, a total sum of the currents following through a ground line GL-H connected to each current supply is also reduced. A voltage drop due to wiring resistance Rgl-h(j+k) on the ground line connected to the current supply CCS(j) is thereby reduced so that the gate-source voltage Vccsgs of the transistor within the current supply CCS(j+k) becomes larger.

(4): as a result that the condition of (3) has been attained, i.e. due to the fact that the gate-source voltage Vccsgs of the transistor within the current supply CCS(j+k) is increased, a current greater than normal is caused to flow through the vertical signal line SL-V(j+k) connected to the pixel P(i, j+k) on which the high-luminance light is not incident.

(5): as a result that the condition of (4) has been attained, when the current is increased, the gate-source voltage Vgs of the amplification transistor within the pixel P(i, j+k) also becomes greater than that at the time of incidence of normal light, and as a result, the value of signal becomes greater than normal (lighter as an image).

Accordingly, a dark region reflected as black on the image when condition is normal or a region on the left and right of the region on which the high-luminance light is incident is reflected on the image inevitably in a lighter-than-black condition when the high-luminance light is incident. As a result, a lighter band-like transverse stripe is observed along a row direction on the left and right of where the high-luminance light is incident.

As a measure to avoid this transverse stripe phenomenon occurring at the time of incidence of high-luminance light, one constructed as in the following has been proposed for example in Japanese Patent Application Laid-Open 2001-230974. Specifically in the proposed construction, a clip circuit for example to clip voltage of the vertical signal line is separately provided to clip the vertical signal line by a predetermined voltage in the period of reading signal of light so that the voltage of the vertical signal line is controlled so as not to depart from an operation range of the current supply.

SUMMARY OF THE INVENTION

In a first aspect of the invention, there is provided a solid-state imaging apparatus including: a pixel section having a plurality of pixels two-dimensionally arranged into a matrix, each pixel containing a photoelectric conversion section for converting an incident light into signal electric charges, an accumulation section for accumulating the signal electric charges, a transfer section for transferring the signal electric charges to the accumulation section, an amplification section for amplifying and outputting as pixel signal the signal electric charges accumulated at the accumulation section, and a reset section for resetting the accumulation section by supplying an electric potential retained on a power supply line to the accumulation section, the pixel section having output signal lines provided column by column onto which the pixel signal is outputted, connected to the other end of a constant current supply having one end grounded; and a control section where, of a first one of the pixels and a second one of the pixels connected to the same one output signal line, taking the first pixel as one of the pixels subject to reading of pixel signal conforming to the incident light and the second pixel as non-subject one of the pixels set in accordance with a location of the first pixel, an output from the second pixel onto the output signal line is used at the time of outputting of the pixel signal from the first pixel onto the output signal line to effect control so that an electric potential difference between the one end and the other end of the constant current supply is kept in a range where the constant current supply is operable.

In a second aspect of the invention, the control section in the solid-state imaging apparatus according to the first aspect sets the second pixel near to the first pixel.

In a third aspect of the invention, the control section in the solid-state imaging apparatus according to the first aspect causes an output when driving the reset section within the second pixel to be outputted from the second pixel onto the output signal line.

In a fourth aspect of the invention, the electric potential of the power supply line of the pixel in the pixel section in the solid-state imaging apparatus according to the third aspect is changeable row by row by the control section, and the control section respectively sets a first electric potential corresponding to reading of pixel signal conforming to the incident light to the power supply line associated with the first pixel and a second electric potential corresponding to keeping and control of operation for the constant current supply to the power supply line associated with the second pixel.

In a fifth aspect of the invention, the control section in the solid-state imaging apparatus according to the first aspect causes an end timing of outputting from the second pixel onto the output signal line to be delayed from an end timing of outputting of the pixel signal from the first pixel onto the output signal line.

In a sixth aspect of the invention, the pixel section in the solid-state imaging apparatus according to the third aspect is formed such that the power supply lines of all pixels are connected in common to a single power supply of which the electric potential is changeable by the control section, and the control section, taking a timing for driving the reset section within the second pixel as a first timing, drives the reset section of the first pixel by a second timing different from the first timing, and respectively changes the electric potential of the power supply at the first timing to a second electric potential corresponding to keeping and control of operation for the constant current supply and at the second timing to a first electric potential corresponding to reading of pixel signal conforming to the incident light.

In a seventh aspect of the invention, the control section in the solid-state imaging apparatus according to the fourth aspect maintains the electric potential of the power supply line of the second pixel to an electric potential corresponding to keeping and control of operation for the constant current supply and causes the reset section to remain in its driven state even after the outputting of the pixel signal from the first pixel onto the output signal line.

DESCRIPTION OF THE PREFERRED EMBODIMENTS

Some embodiments of the solid-state imaging apparatus according to the present invention will be described below with reference to the drawings.

The present invention is to suppress an occurrence of the transverse stripe phenomenon at the time of incidence of high-luminance light with using an output of pixel of the pixel section without providing a separate clip circuit. Specifically, variance in the suppressing operation is controlled by using the fact that the gate-source voltages of amplification transistor of pixels proximate to each other do take near values due to the manufacturing process. In particular, a pixel for generating clip voltage is selected so that it is always proximate to the pixel from which signal of light is read out, thereby generating a clip voltage for preventing the transverse stripe phenomenon at the time of incidence of high luminance light with using the fact that the gate-source voltages of the respective amplification transistors of the two pixels take near (substantially the same) values.

Embodiment 1

A specific first embodiment will now be described. In the first embodiment, a clip voltage generating pixel is set in the vicinity of a pixel for reading signal, and in accordance with movement of the pixel (row) to be read, the clip voltage generating pixel (row) connected to the same one vertical signal line SL-V(j) is also correspondingly moved. The values of the respective gate-source voltages Vgs of the amplification transistors in the clip voltage generating pixel and the pixel for reading signal of light are thereby made near to each other throughout the reading of light signals of all pixels.

Figure 1:
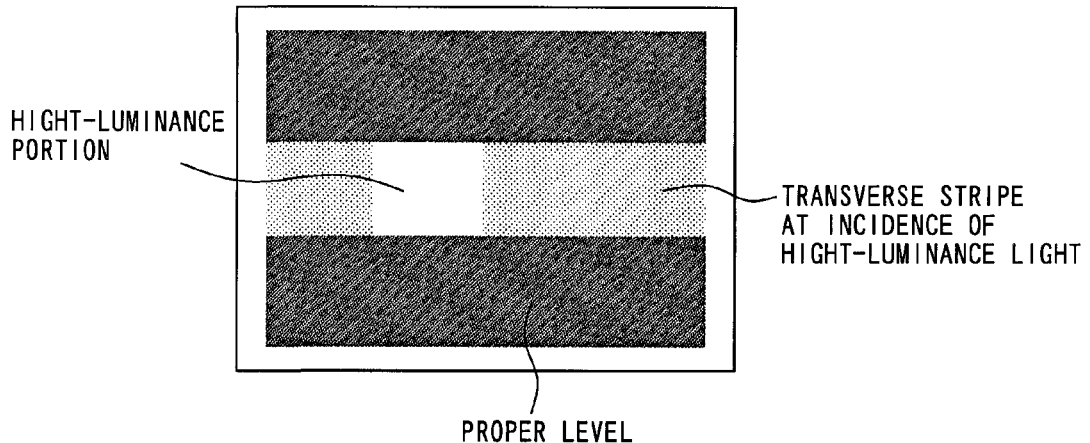
FIG. 1 illustrates a manner of occurrence of the transverse stripe phenomenon when a high-luminance light is incident in the vicinity of a center of an image sensor.
Figure 2:
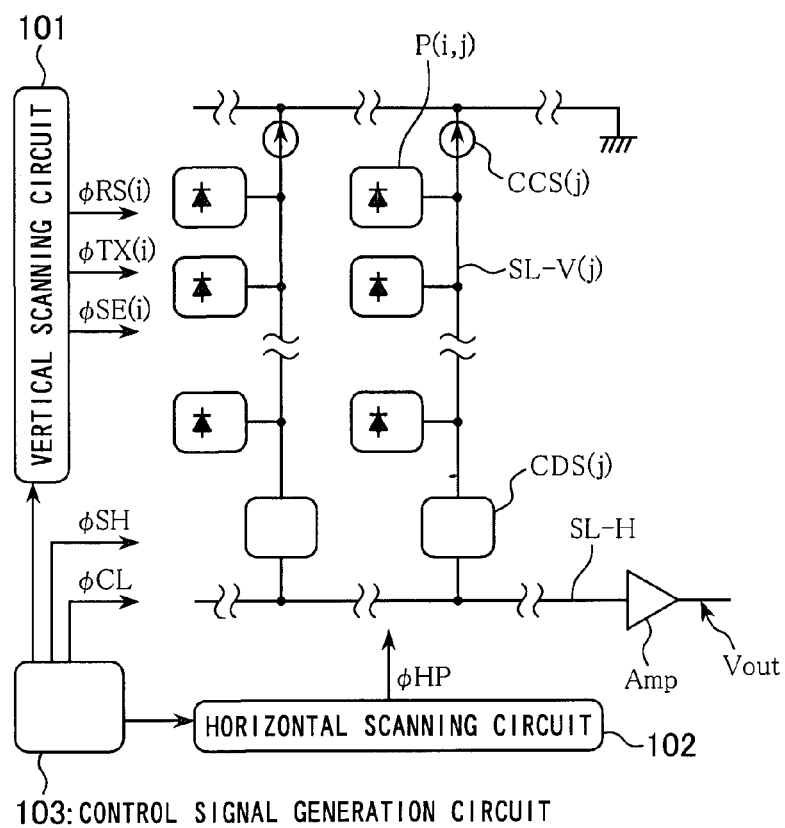
FIG. 2 is a block diagram schematically showing construction of a prior-art MOS image sensor.
Figure 3:
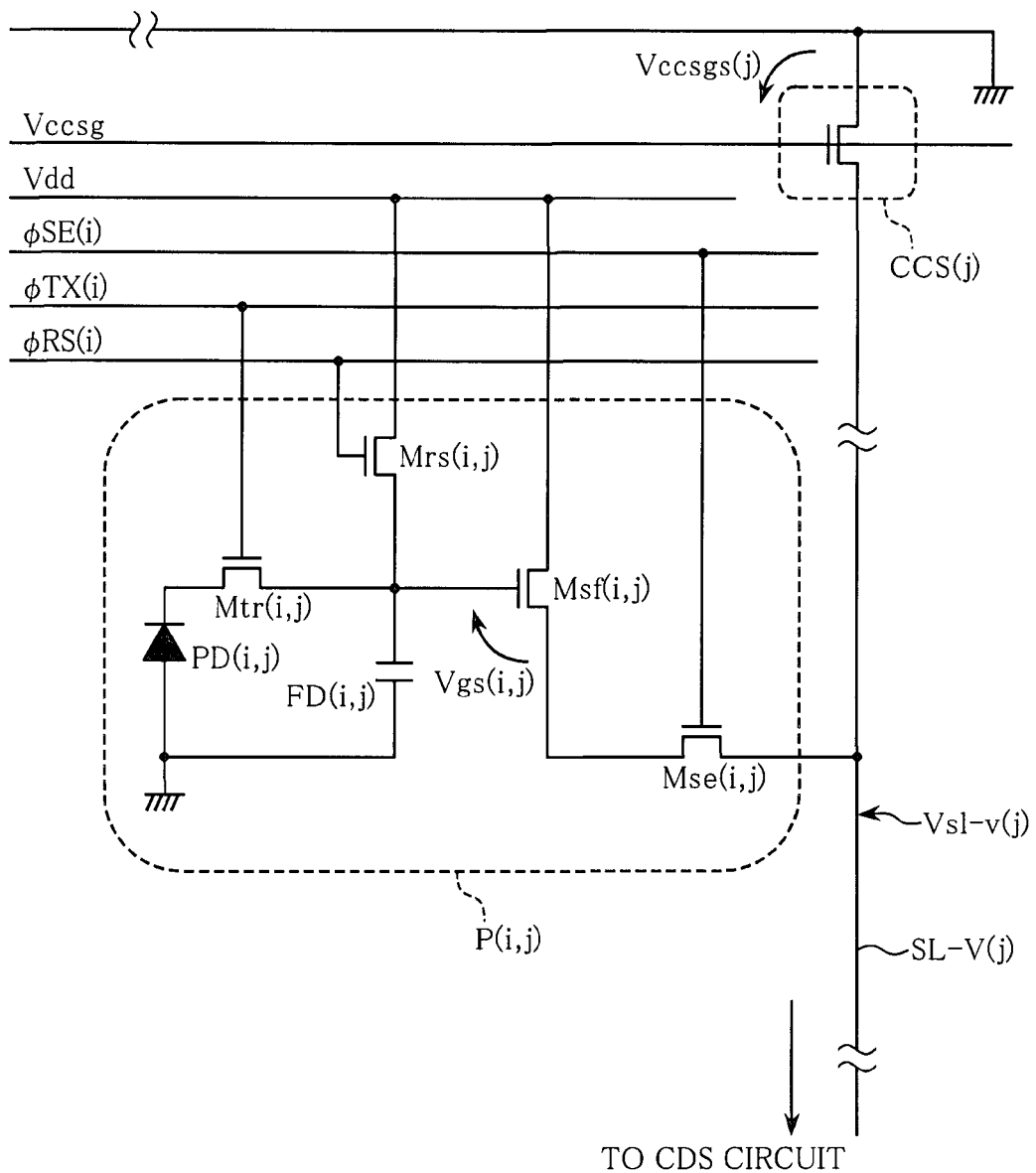
FIG. 3 is a circuit diagram showing construction of pixel in the MOS image sensor shown in FIG. 2.
Figure 4:
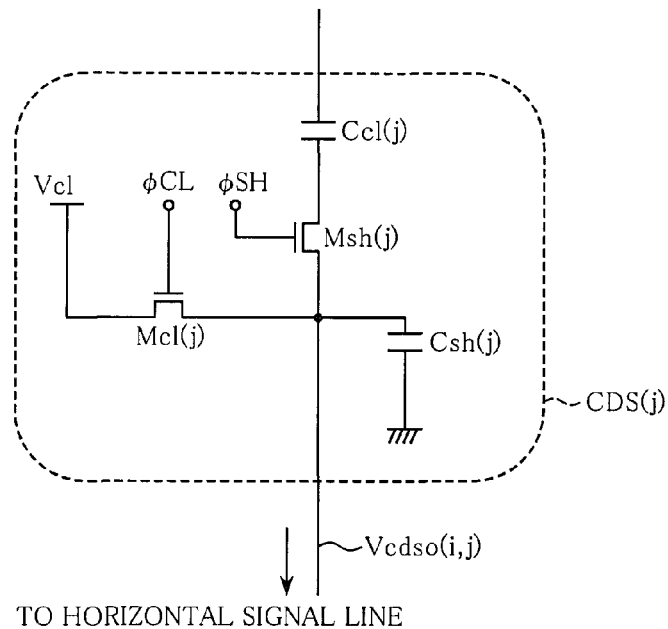
FIG. 4 is a circuit diagram showing construction of a CDS circuit in the MOS image sensor shown in FIG. 2.
Figure 5:
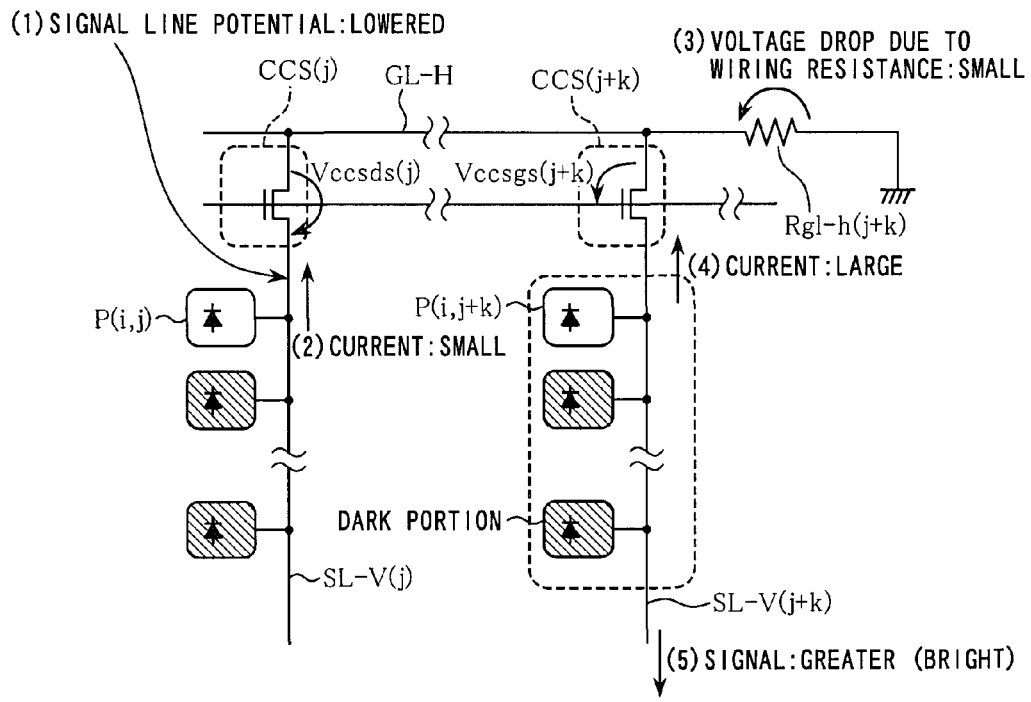
FIG. 5 illustrates operation when a high-luminance light enters the MOS image sensor shown in FIG. 2.
Figure 6:
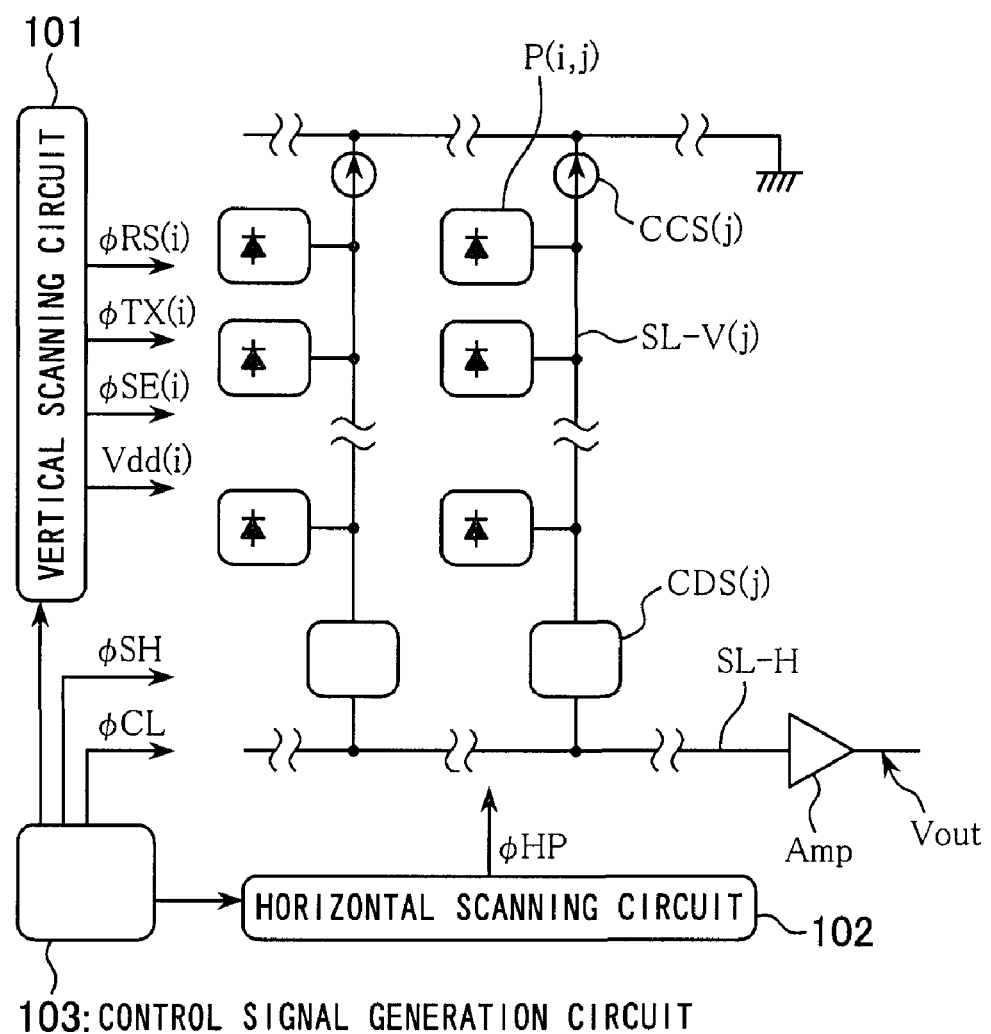
FIG. 6 is a block diagram schematically showing construction of a first embodiment of the solid-state imaging apparatus according to the invention.
Figure 7:
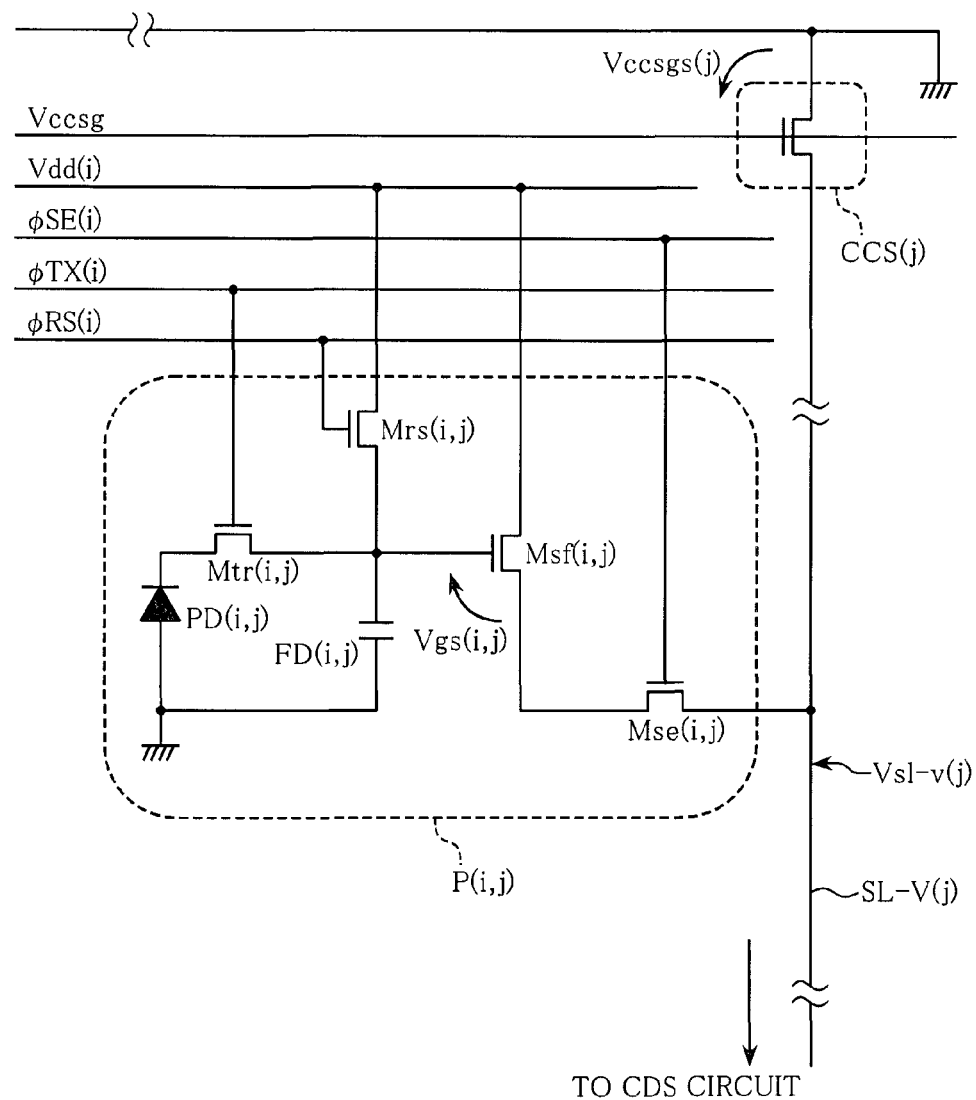
FIG. 7 is a circuit diagram showing construction of pixel in the first embodiment shown in FIG. 6.

FIG. 6 is a block diagram of the MOS solid-state imaging apparatus according to the first embodiment, where like or corresponding components as in the prior-art example shown in FIG. 2 are denoted by like symbols, and a description thereof will be partially omitted. Also in the first embodiment, pixels P(i, j)(i, j being an integral number) are arranged into a two-dimensional array; it is different from the prior-art example shown in FIG. 2 in that the pixel power supply Vdd(i) to each pixel is made variable row by row, and the construction of the rest is identical as the prior-art example shown in FIG. 2. The construction of CDS circuit CDS(j) is also identical to that in the prior-art example shown in FIG. 4. FIG. 7 is a circuit diagram showing construction of a pixel P(i, j) in FIG. 6; it is of the same construction as the prior-art example shown in FIG. 3 except that the pixel power supply Vdd(i) is made variable row by row.

Figure 8A:
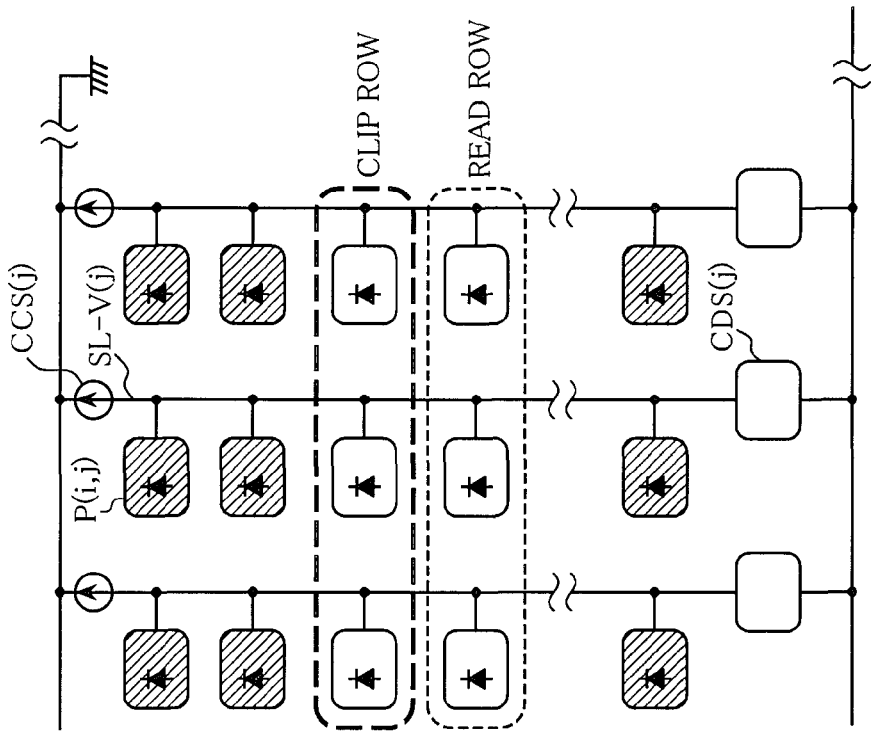
FIGS. 8A and 8B illustrate the manner where the clip voltage generating pixel row is moved in accordance with movement of the signal reading pixel row.
Figure 8B:
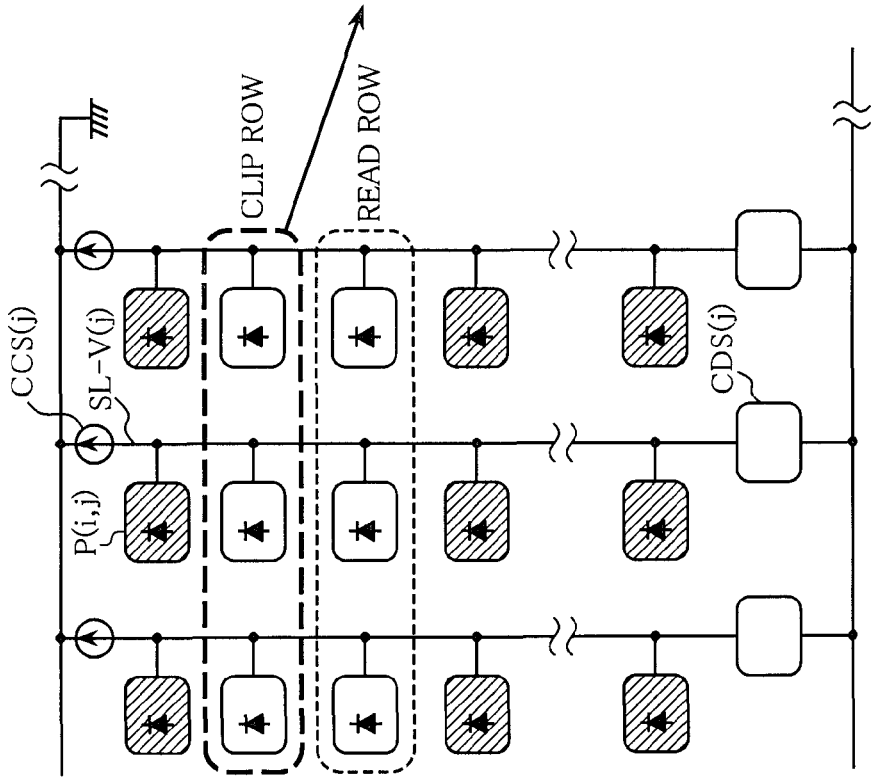

FIGS. 8A and 8B typically illustrate the manner in which the clip voltage generating pixel is moved in accordance with movement of the pixel for reading signal. In FIG. 8A, pixels of the third pixel row are the pixels for reading light signal, and pixels of the second pixel row connected to the same one vertical signal line SL-V(j) are the pixels for generating clip voltage. FIG. 8B shows the manner in which the signal reading pixel row has moved to the fourth row, and as a result of such moving, the clip voltage generating pixel row has been moved to the third row connected to the same one vertical signal line SL-V(j). By moving the clip voltage generating pixel in this manner so that it comes near to the signal reading pixel, the respective gate-source voltages Vgs of each amplification transistor of the light signal reading pixel and the clip voltage generating pixel are to take near values to each other. In the construction shown in FIGS. 8A and 8B, those pixels after ending light signal readout are used to generate clip voltage.

Figure 9:
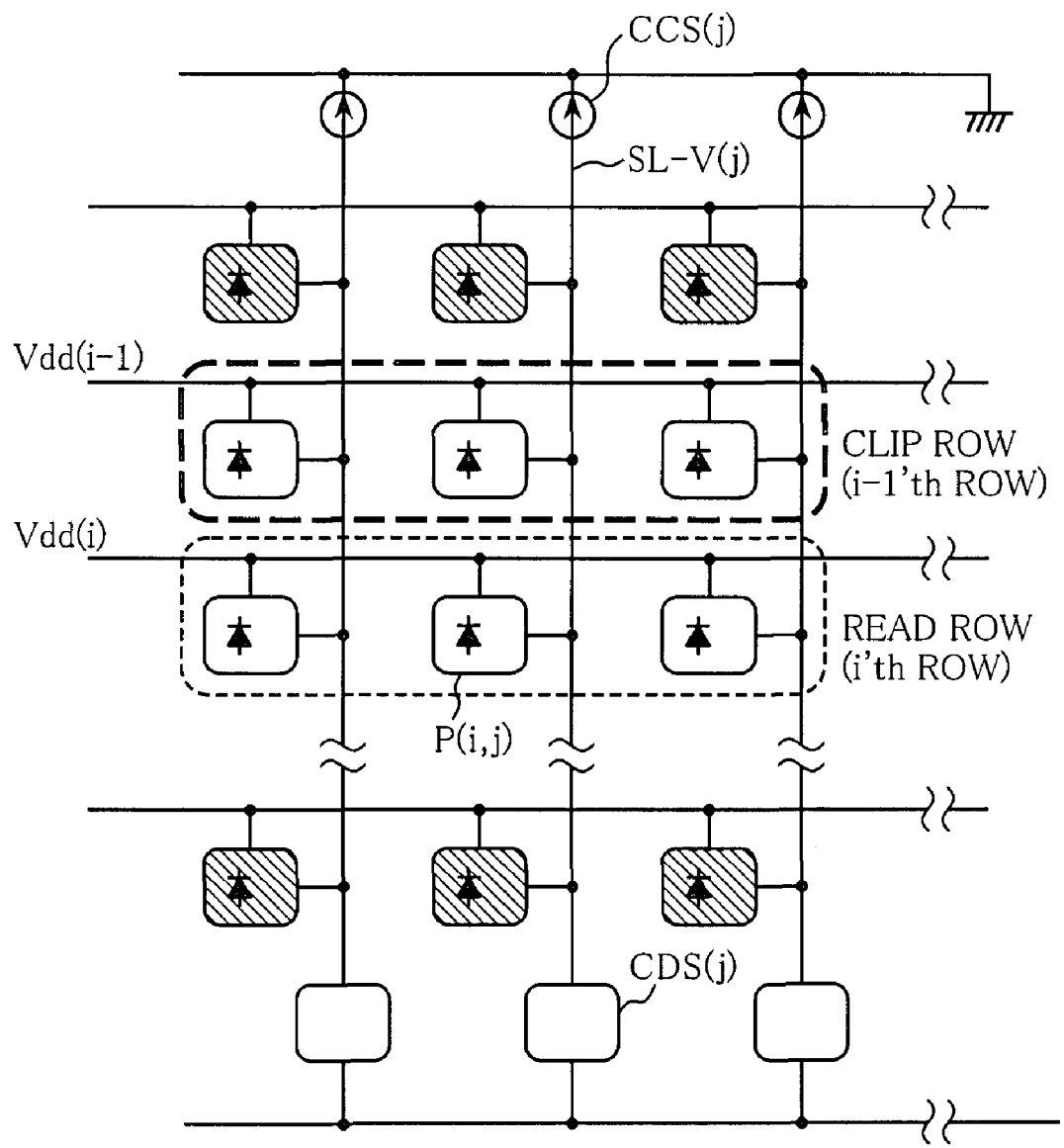
FIG. 9 shows the manner where the pixel power supply Vdd(i) is driven so as to cause an independent change row by row in the first embodiment shown in FIG. 6.

FIG. 9 is a partially omitted block diagram showing the manner of driving the pixel power supply Vdd(i) in the first embodiment so that it is changed independently for each row, where a pixel power supply Vdd(i) is applied on the signal reading pixel row of the i'th row, and where a pixel power supply Vdd(i−1) different from the pixel power supply Vdd(i) is applied on the clip voltage generating pixel row of the (i−1)'th row.

Figure 10:
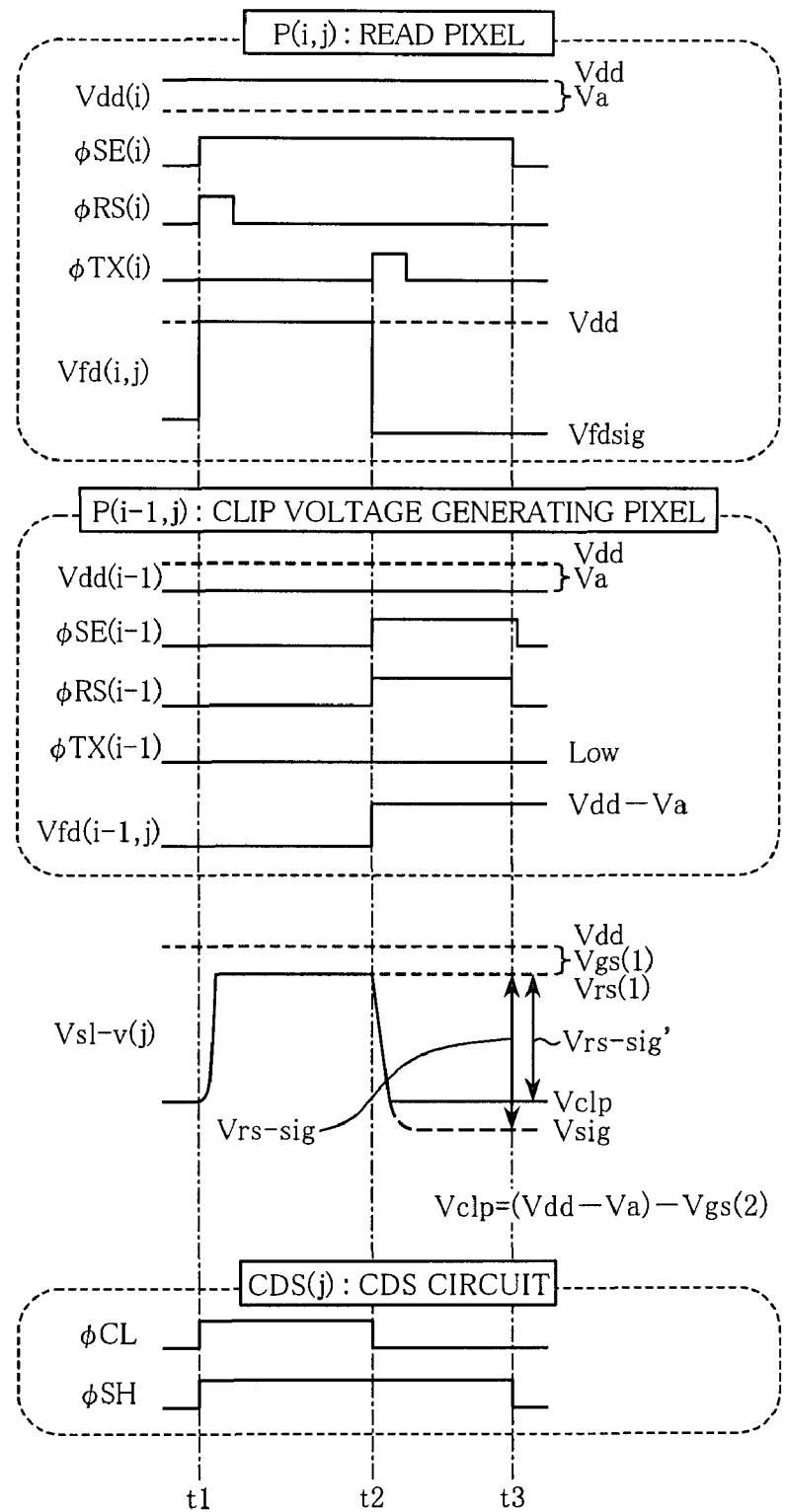
FIG. 10 is a timing chart for explaining read operation of pixel signal in the first embodiment shown in FIG. 6.

A read operation of the pixel signals will now be described by way of a timing chart shown in FIG. 10. First, a power supply voltage Vdd is applied as pixel power supply Vdd(i) at the signal read pixel P(i, j), and a voltage (Vdd−Va) lower by Va than the power supply voltage Vdd is applied as pixel power supply Vdd(i−1) at the clip voltage generating pixel P(i−1, j). At time t1, when the select pulse φ SE(i) and the reset pulse φ RS(i) for the signal read pixel P(i, j) are driven to H level, voltage Vfd(i, j) of the floating diffusion section is fixed to the power supply voltage Vdd. The voltage Vsl−v(j) on the vertical signal line SL-V(j) thereby attains Vrs(1)[=Vdd−Vgs (1)]. Here, Vgs(1) is the gate-source voltage of the amplification transistor of the signal read pixel P(i, j). Further at time t1, both the clamp pulse φ CL and the sample-and-hold pulse φ SH of the CDS circuit are also at H level.

Next at time t2, when the transfer pulse φ TX(i) of the signal read pixel P(i, j) is driven to H level, voltage of the floating diffusion section of the signal read pixel falls due to accumulated electric charges of photodiode, and attains Vfd (i, j)=Vfdsig. At time t2, of the clip voltage generating pixel P(i−1, j), the select pulse φ SE(i−1) and the reset pulse φ RS(i−1) attain H level, thereby voltage of the floating diffusion section is fixed to (Vdd−Va). It should be noted that, at time t2, the clamp pulse φ CL of the CDS circuit attains L level so that voltage Vsl−V(j) [=Vdd−Vgs(1)] of the vertical signal line SL-V(j) at that point in time is clamped.

In the case where clip voltage by the clip voltage generating pixel is not to be generated, due to transfer of accumulated electric charges from the photodiode in the signal read pixel (i, j), the voltage Vsl−v(j) of the vertical signal line SL-V(j) falls to Vsig. The voltage Vsl−v(j) of the vertical signal line SL-V(j), however, is clipped to Vsig'=Vclip=[(Vdd−Va)−Vgs (2)] by the clip voltage generating pixel, thereby the constant current supply CCS(j) connected to the vertical signal line SL-V(j) does not enter its non-saturation region so that the transverse stripe phenomenon is suppressed (Vclip being a value at which the constant current supply CCS(j) does not enter its non-saturation region). At time t3, the select pulse φ SE(i) is brought to L level at the signal read pixel P(i, j) and the select pulse φ SE(i−1) and the reset pulse φ RS(i−1) to L level at the clip voltage generating pixel (i−1, j), and at the same time the sample-and-hold pulse φ SH of the CDS circuit is brought to L level so as to effect processing by the CDS circuit. Meantime, the timing that the select pulse φ SE(i−1) is brought to L level is somewhat delayed from the time t3.

In the above clip operation, whether the output of the signal read pixel is clipped or not is determined by a value of Verr in the following equation (1), and if Verr>0, the output of the pixel to be read is clipped at Vclip. In equation (1): Vgs(1) is a gate-source voltage of the amplification transistor of the signal read pixel; Vgs(2) is a gate-source voltage of the amplification transistor of the clip voltage generating pixel; Vrs(1) is a reset level of the pixel to be read; the clip voltage Vclip is a voltage at which the current supply CCS(j) does not enter its non-saturation region; and Vrs-sig is a signal output.

Verr>0: clip operation is effective.

$$Verr = Vclip - Vsig \qquad (1)$$
$$= \{Vdd - Va - Vgs(2)\} - \{Vdd - Vgs(1) - Vrs - sig\}$$
$$= -Va - Vgs(2) + Vgs(1) + Vrs - sig$$

-continued $$= -Vgs(2) + Vgs(1) + const \text{ (where } Va, Vrs - sig = const)$$

$$= const \text{ [where } Vgs(2) = Vgs(1)]$$

In the present embodiment, since an adjacent pixel connected to the same one vertical signal line SL-V(j) as the pixel to be read is used as the clip voltage generating pixel, the gate-source voltages Vgs of the amplification transistors of the two pixels are substantially the same [Vgs(2)=Vgs(1)]; it is seen from this that Verr in the above equation (1) is a constant not depending on the gate-source voltage Vgs of the amplification transistor. The threshold to clip, therefore, does not depend on the gate-source voltage of the amplification transistor.

The signal output Vrs–sig' when the clip operation is made effective is shown in the following equation (2).

$$Vrs - sig' = Vrs(1) - Vclip \qquad (2)$$

$$= \{Vdd - Vgs(1)\} - \{Vdd - Va - Vgs(2)\}$$

$$= Va + Vgs(2) - Vgs(1)$$

$$= Va \text{ [where } Vgs(2) = Vgs(1)]$$

In the present embodiment, since an adjacent pixel connected to the same one vertical signal line SL-V(j) as the pixel for reading signal is used as the clip voltage generating pixel, the respective gate-source voltages Vgs of the amplification transistors of the two pixels are substantially the same [Vgs(2)=Vgs(1)] so that the signal output Vrs–sig' in the above equation (2) takes a value consisting of Va only; an amount corresponding to the gate-source voltage Vgs of the amplification transistor is eliminated so that noise due to variance in the gate-source voltage Vgs is reduced.

Embodiment 2

Figure 11:
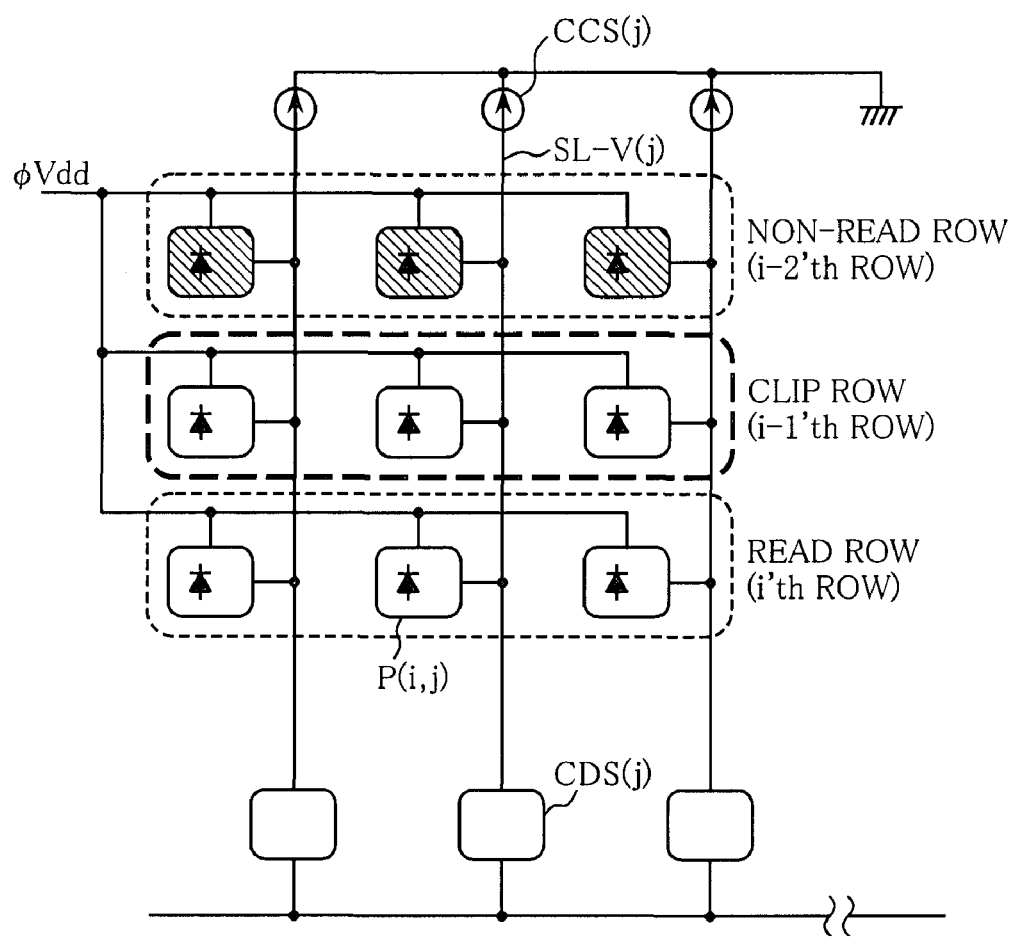
FIG. 11 is a partially omitted block diagram showing construction of a second embodiment of the solid-state imaging apparatus according to the invention.
Figure 12:
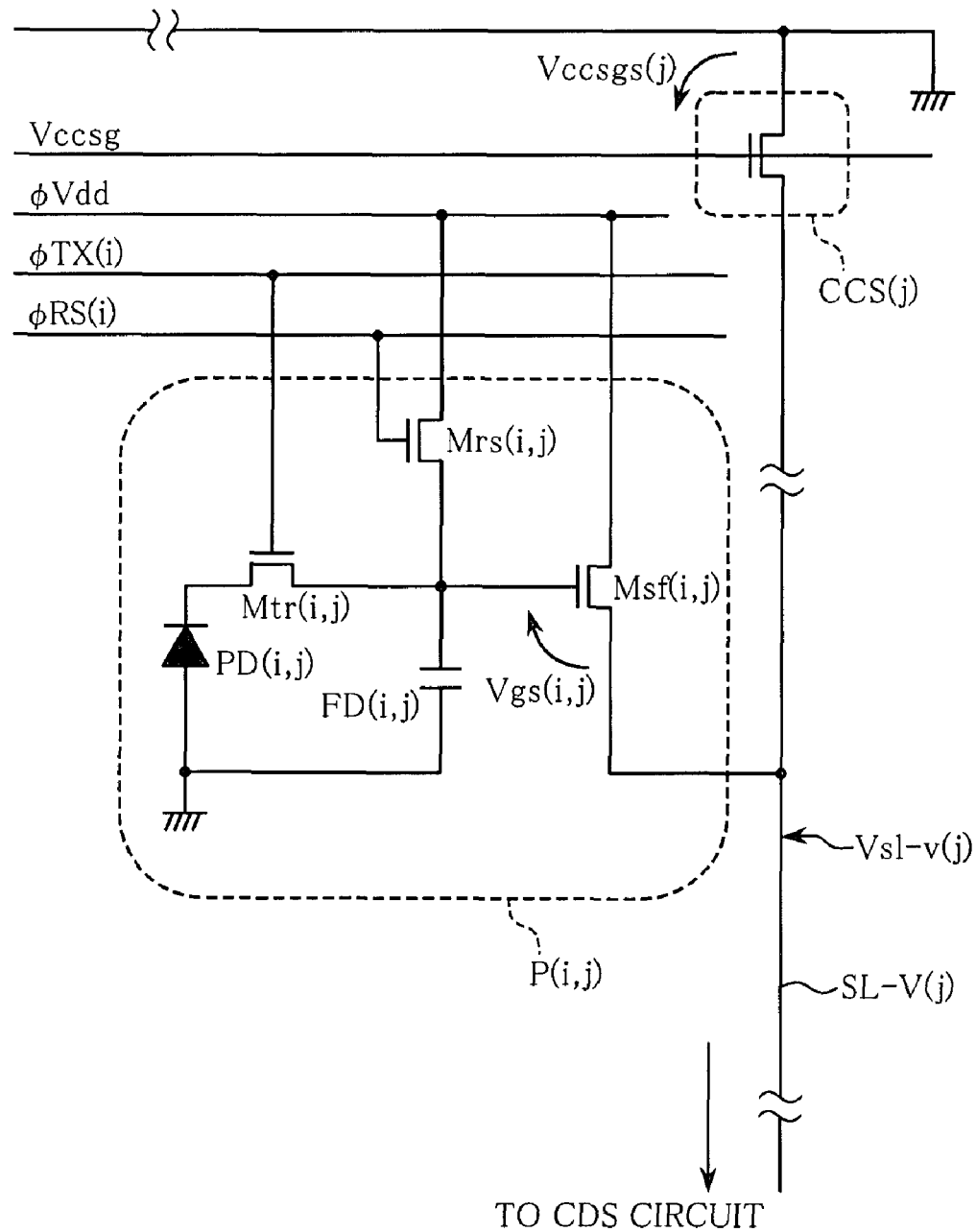
FIG. 12 is a circuit diagram showing construction of pixel in the second embodiment shown in FIG. 11.

A second embodiment of the invention will now be described. FIG. 11 is a block diagram showing in a partially omitted manner construction of the solid-state imaging apparatus according to the second embodiment. Here, only a portion corresponding to 3 rows by 3 columns is shown for ease of explanation as the pixel section having two-dimensionally arranged pixels, and a case is shown where a pixel row of i' th row is supposed as the pixel row for reading signal, a pixel row of (i–1)' th row as the pixel row for generating clip voltage, and a pixel row of (i–2)' th row as pixel row not to be read. FIG. 12 is a circuit diagram showing a pixel construction of unit pixel of the pixel section shown in FIG. 11, where each unit pixel is not provided with a select transistor as that in the pixel of the first embodiment but includes: a photodiode PD(i, j); a floating diffusion section FD(i, j); a transfer transistor Mtr(i, j); an amplification transistor Msf(i, j); and a reset transistor Mrs(i, j). One end of the amplification transistor of each pixel arranged in a column direction is respectively connected in common to a vertical signal line SL-V(j). A pixel power supply φ Vdd to the power supply line connected in common to each pixel then is driven in a manner of pulse to 3 electric potentials, i.e. a power supply voltage Vdd, a clip voltage (Vdd–Va), and a voltage (Vdd–Va–Vb) lower than the clip voltage. The construction of the rest is similar to the first embodiment.

Figure 13:
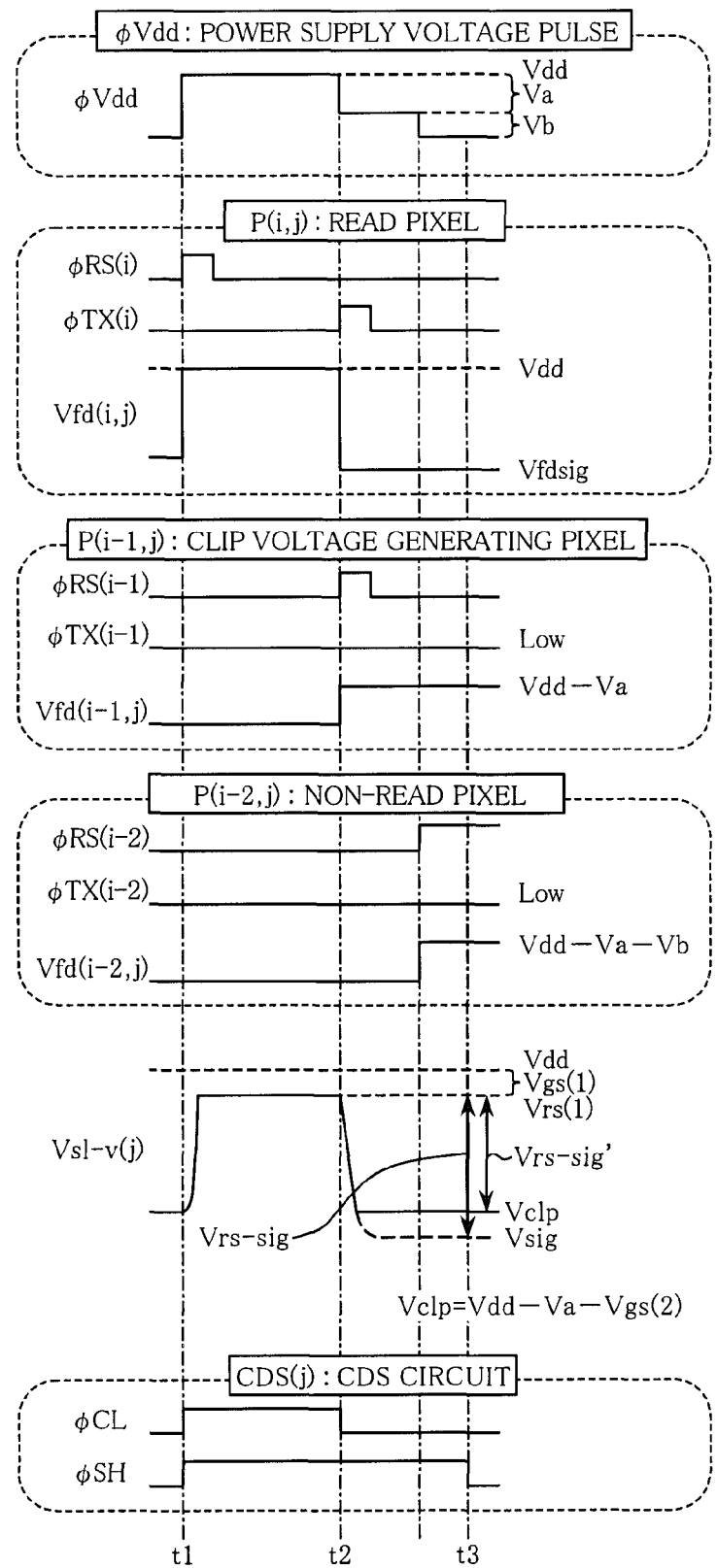
FIG. 13 is a timing chart for explaining operation of the second embodiment shown in FIG. 11.

FIG. 13 is a timing chart for explaining operation of the solid-state imaging apparatus according to the second embodiment having the above construction. The operation of this embodiment is different from the operation of the first embodiment only in the following operation based on the fact that the pixel is formed as having 3-transistor construction and the pixel power supply φ Vdd is driven in a manner of pulse to 3 electric potentials. In particular, the pixel power supply φ Vdd to the pixel row to become a non-read pixel row [(i–2)' th row] is set to a voltage (Vdd–Va–Vb) that is lower than the clip voltage (Vdd–Va) so as not to output a pixel output of the non-read pixel row onto the vertical signal line SL-V(j) so that the signal readout of the row to be read is not affected.

Also in the case of such construction, by sequentially moving the pixel row for reading signal and the pixel row for generating clip voltage similarly to the first embodiment, it is possible to obtain an image signal where the transverse stripe phenomenon is prevented. Then in the present embodiment, since the pixel power supply φ Vdd to all the pixel rows is driven in a manner of pulse, there is an advantage that the number of pixel power supply for controlling each pixel row can be reduced to thereby make the construction simpler.

In the construction according to the present invention as has been described by way of the above embodiments, at the time of outputting the pixel signal of a first pixel of the pixel section, the output of a second pixel connected to the same one output signal line as the first pixel is used so that a constant current supply connected to one end of the output signal line is kept in its operable range. It is thereby possible to achieve a solid-state imaging apparatus capable of effectively suppressing the transverse stripe phenomenon at the time of incidence of high-luminance light with controlling variance without providing a separate clip circuit.

What is claimed is:

1. A solid-state imaging apparatus comprising:
   a pixel section having a plurality of pixels two-dimensionally arranged into a matrix, each pixel containing a photoelectric conversion section for converting an incident light into signal electric charges, an accumulation section for accumulating said signal electric charges, a transfer section for transferring said signal electric charges to the accumulation section, an amplification section for amplifying and outputting as pixel signal said signal electric charges accumulated at said accumulation section, and a reset section for resetting the accumulation section by supplying an electric potential retained on a power supply line to said accumulation section, said pixel section having output signal lines provided column by column onto which said pixel signal is outputted, connected: to the other end of a constant current supply having one end grounded; and
   a control section where, of a first one of said pixels and a second one of said pixels connected to the same one of said output signal lines, taking said first pixel as one of said pixels subject to reading of pixel signal conforming to said incident light and said second pixel as non-subject one of said pixels set in accordance with a location of said first pixel, an output from said second pixel onto said output signal line is used at the time of outputting of said pixel signal from said first pixel onto said output signal line to effect control so that an electric potential difference between the one end and the other end of said constant current supply is kept in a range where said constant current supply is operable.

2. The solid-state imaging apparatus according to claim 1, wherein said control section sets said second pixel near to said first pixel.

3. The solid-state imaging apparatus according to claim 1, wherein said control section causes an end timing of outputting from said second pixel onto said output signal line to be delayed from an end timing of outputting of said pixel signal from said first pixel onto said output signal line.

4. The solid-state imaging apparatus according to claim 1, wherein said control section causes an output at the time of driving said reset section within said second pixel to be outputted from said second pixel onto said output signal line.

5. The solid-state imaging apparatus according to claim 4, wherein said pixel section is formed such that said power supply lines of all pixels are connected in common to a single power supply of which the electric potential is changeable by said control section, wherein said control section, taking a timing for driving said reset section within said second pixel as a first timing, drives the reset section of said first pixel by a second timing different from said first timing, and respectively changes the electric potential of said power supply at said first timing to a second electric potential corresponding to keeping and control of operation for said constant current supply and at said second timing to a first electric potential corresponding to reading of pixel signal conforming to said incident light.

6. The solid-state imaging apparatus according to claim 4, wherein the electric potential of said power supply line of said pixel in said pixel section is changeable row by row by said control section, wherein said control section respectively sets a first electric potential corresponding to reading of pixel signal conforming to said incident light to said power supply line associated with said first pixel and a second electric potential corresponding to keeping and control of operation for said constant current supply to said power supply line associated with said second pixel.

7. The solid-state imaging apparatus according to claim 6, wherein said control section maintains the electric potential of said power supply line of said second pixel to an electric potential corresponding to keeping and control of operation for said constant current supply and causes said reset section to remain in its driven state even after the outputting of said pixel signal from said first pixel onto said output signal line.

* * * * *